United States Patent [19]

Stein et al.

[11] Patent Number: 5,468,794

[45] Date of Patent: * Nov. 21, 1995

[54] ROOM TEMPERATURE ADDITION-CURABLE SILICONE ADHESIVE COMPOSITIONS AND N-HETEROCYCLIC SILANE ADHESION PROMOTERS

[75] Inventors: Judith Stein, Schenectady; Mark W. Davis, Clifton Park, both of N.Y.

[73] Assignee: General Electric Company, Schenectady, N.Y.

[*] Notice: The portion of the term of this patent subsequent to Jan. 10, 2012, has been disclaimed.

[21] Appl. No.: 303,364

[22] Filed: Sep. 13, 1994

Related U.S. Application Data

[63] Continuation-in-part of Ser. No. 165,625, Dec. 13, 1993, Pat. No. 5,380,788.

[51] Int. Cl.$^6$ ....................................... C08K 5/54
[52] U.S. Cl. .................... 524/188; 524/731; 524/714; 524/13; 524/16; 524/430; 524/433; 524/435; 524/401; 524/442; 524/423; 524/449; 524/588; 524/786; 524/789; 524/780; 524/783; 524/861; 524/862; 524/702; 524/703; 524/445; 525/104; 528/15
[58] Field of Search ................. 528/15; 524/188, 524/731, 714, 13, 16, 430, 433, 435, 401, 442, 423, 449, 588, 786, 789, 780, 783, 861, 862, 702, 703, 445; 525/104

[56] References Cited

U.S. PATENT DOCUMENTS

| | | | |
|---|---|---|---|
| 3,284,406 | 11/1966 | Nelson | 525/477 |
| 5,164,461 | 11/1992 | Mitchell et al. | 525/479 |
| 5,342,870 | 8/1994 | Stein et al. | 528/15 |
| 5,362,781 | 11/1994 | Stein | 528/15 |
| 5,380,788 | 1/1995 | Stein et al. | 524/730 |

*Primary Examiner*—Melvyn I. Marquis
*Attorney, Agent, or Firm*—William H. Pittman

[57] ABSTRACT

Room temperature vulcanizable platinum group metal catalyzed silicone compositions are provided which utilize an N-heterocyclic adhesion promoter, such as 2,6 bis(trimethoxysilyltrimethyleneoxy)pyridine. Cohesive bonding is effected on various substrates.

9 Claims, No Drawings

ROOM TEMPERATURE ADDITION-CURABLE SILICONE ADHESIVE COMPOSITIONS AND N-HETEROCYCLIC SILANE ADHESION PROMOTERS

CROSS-REFERENCE TO RELATED APPLICATIONS

This application is a continuation in part of application Ser. No. 08/165,625, filed Dec. 13, 1993, U.S. Pat. No. 5,380,788.

BACKGROUND OF THE INVENTION

The present invention relates to platinum group metal catalyzed room temperature addition-curable silicone adhesive compositions employing an N-heterocyclic silane, such as 2,6 bis(trimethoxysilyltrimethyleneoxy)pyridine, as an adhesion promoter, and to such bis silyl pyridine adhesion promoter compositions.

As shown by Kasuya, U.S. Pat. No. 3,284,406, the adhesion of a cured platinum catalyzed addition-curable silicone composition onto a substrate is achieved by effecting the cure of the silicone composition at a temperature in the range of at least 70° C. and preferably at least 100° C.

Mitchell et al, U.S. Pat. No. 5,164,461, which is incorporated herein by reference, is directed to the use of certain silylmaleates, silylmaleimides or silylfumarates, such as bis[3-(trimethoxysilyl)alkyl] fumarates as adhesion promoters in addition-curable silicone adhesive compositions. Although the addition-curable silicone compositions of Mitchell et al have been found to be self-bonding to various substrates, such as plastics, metals or glass, these silicone adhesive compositions also require a temperature of about 100° C. to about 150° C. to effect a satisfactory cure.

It would be desirable therefore to provide platinum group metal catalyzed addition-curable silicone adhesive compositions which would bond satisfactorily onto an unprimed substrate, such as plastic or metal when applied thereto at ambient temperatures. In addition, it also would be desirable to produce a silicone-substrate composite having a silicone-layer which would fail cohesively instead of adhesively when tested. As used hereinafter, the expression "adhesive failure" means that the silicone layer cleanly separates from the substrate, while in a "cohesive failure" rupture can occur in the silicone layer or in the substrate.

SUMMARY OF THE INVENTION

The present invention is based on the discovery that certain N-heterocyclic silanes, such as a bis(trialkoxysilylalkyleneoxy)pyridine, have been found to be effective as adhesion promoters when used in a platinum group metal catalyzed addition-curable silicone composition, as defined hereinafter. In addition, the resulting curable composition, has been found to provide a silicone adhesive which can cure under ambient conditions and produce a cohesive bond when cured in contact with a plastic or metallic substrate. In some instances, optimum adhesion results can be achieved if the substrate has a clean surface.

The expression "clean surface" is used sometimes hereinafter, with respect to the pretreatment of certain types of substrates such as a polyetherimide or an aluminum substrate.

STATEMENT OF THE INVENTION

There is provided by the present invention, a room temperature vulcanizable addition-curable composition, comprising by weight, (A) 100 parts of a vinyl-containing polydiorganosiloxane composition comprising:
  (i) about 50 to about 100 parts of an essentially cyclic-free vinyl containing polydiorganosiloxane having a viscosity of from about 100 to about 1,000,000 centipoise at 25° C. and organo groups attached to silicon by carbon-silicon bonds, selected from the class consisting of alkyl radicals having 1 to 8 carbon atoms, phenyl radicals, fluoroalkyl radicals having 3 to 10 carbon atoms and mixtures thereof, where the essentially cyclic-free vinyl containing polydiorganosiloxane has a vinyl content of from about 0.02 to about 2.0 weight %, and
  (ii) from about 0 to about 50 parts of a solid, benzene-soluble vinyl-containing resin copolymer comprising, $(R)_3SiO_{1/2}$ units and $SiO_{4/2}$ units, where R is a vinyl radical, or a monovalent hydrocarbon radical free of aliphatic unsaturation and containing no more than six carbon atoms, the ratio of $(R)_3SiO_{1/2}$ units to $SiO_{4/2}$ units being from about 0.5:1 to about 1.5:1, and the resin having a vinyl content of from about 1.5 to about 3.5% by weight, (B) from about 1 to about 20 parts of a hydrogen-containing polysiloxane having an average unit formula, $$R^1{}_aH_bSiO_{(4-a-b)/2} \qquad (1)$$

where $R^1$ is a monovalent hydrocarbon radical, or halogenated monovalent hydrocarbon radical having from 1 to about 10 carbon atoms and free of aliphatic unsaturation, "a" has a value of from about 0 to about 3, "b" has a value of from about 0 to about 3, and the sum of "a"+"b" has a value of from 0 to 3, (C) a catalytic amount of a hydrosilylation catalyst, (D) an effective amount of a bis[trialkyloxysilylalkyleneoxy]pyridine adhesion promoter having the formula, $$[(R^2O)_3S_iR^3O]_2C_5H_3N \qquad (2)$$

where $R^2$ is a $C_{(1-4)}$ alkyl radical and $R^3$ is a $C_{(2-8)}$ alkylene radical, (E) from about 0 to about 200 parts of an extending filler, and (F) from about 0 to about 50 parts of a reinforcing filler, and in the absence of (A)(ii), an amount effective for reinforcement.

A further aspect of the present invention is directed to bis[trialkyloxysilylalkenyloxy]pyridines of formula (2). These compounds can be made by effecting reaction between a pyridine dihalide, such as a pyridine dichloride and an alkali metal alkenylalkoxide, such as sodium allylalkoxide. The resulting pyridine bis alkylene ether can be reacted with a trialkoxysilane using a hydrosilylation catalyst, such as platinum.

The room temperature vulcanizable addition-curable compositions of the present invention can be used as adhesives in industrial multilayered laminates. These adhesives also can adhere to a variety of substrates that are in contact with the compositions during curing. Generally, adhesion to glass, metals and metal oxides is excellent. In certain instances, thermoplastic resins, such as polyetherimides may have to be pretreated in 5M aqueous KOH for 5 minutes at 60° C. and rinsed with water while certain metallic substrates, such as alclad aluminum may have to be washed with a detergent. Good adhesion is obtained with phenolic resins, epoxy resins, polycarbonates, polyesters, polyimides, and other thermoplastic materials.

There are included within the bis[trialkyloxysilylalkyleneoxy]pyridines of formula (2), referred to hereinafter as the "adhesion promoters", compounds such as:

2,6 bis(trimethoxysilyltrimethyleneoxy) pyridine,
2,6 bis(triethoxysilyltetramethyleneoxy) pyridine and,
3,5 bis(tributoxysilyltrimethyleneoxy) pyridine.

An effective amount of the adhesion promoter is 0.6 to 2 parts of adhesion promoter by weight, per 100 parts by weight of the platinum group metal catalyzed addition-curable adhesion composition, referred to hereinafter as the "curable composition", or the "room temperature vulcanizible composition".

The essentially cyclic-free vinyl-terminated polydiorganosiloxane preferably has a viscosity of from about 3000 to about 95,000 centipoise at 25° C. Radicals attached to silicon are preferably alkyl radicals of 1 to about 4 carbon atoms, and most preferably methyl. Although the vinyl-containing polydiorganosiloxane is preferably a vinyl terminated polydiorganosiloxane, the present invention also includes vinyl-containing polydiorganosiloxane having terminal groups free of vinyl radicals.

Component (A)(ii) is a vinyl-containing benzene-soluble siloxane resin containing $(R)_3SiO_{1/2}$ units, or (M units), and $SiO_{4/2}$ units, or (Q units), where each R is a vinyl radical, or a monovalent hydrocarbon radical free of aliphatic unsaturation and containing no more than six carbon atoms, the ratio of $(R)_3SiO_{1/2}$ units to $SiO_{4/2}$ units being from about 0.5:1 to about 1.5:1, the resin having a vinyl content of from about 1.5 to about 3.5% by weight. Component (A)(ii) will sometimes be referred to as the "vinyl-containing MQ resin".

Component (A)(ii) may further contain (α) $RSiO_{3/2}$ units, (β) $(R)_2SiO_1$ units, or both (α) and (β), the $(R)_2SiO_1$ units being present in an amount equal to from about 0 to about 10 mole percent based on the total number of moles of siloxane units in (A)(ii), and the $RSiO_{3/2}$ units being present in an amount equal to from about 0 to about 10 mole percent based on the total number of moles of siloxane units in (A)(ii).

Component (A) comprises from about 50 to about 100, and preferably from about 56 to about 100, and most preferably from about 60 to about 75, parts by weight of (A)(i) and from about 0 to about 50, preferably from about 0 to about 40, and most preferably from about 25 to about 40, parts by weight of (A)(ii).

In one preferred embodiment of the composition of the present invention, component (A) comprises from about 60 to about 75 parts by weight of a vinyl terminated polydiorganosiloxane having a viscosity of 65,000 to about 95,000 centipoise at 25° C., and from about 25 to about 40 parts by weight of the vinyl-containing MQ resin.

In another preferred embodiment of the composition of the present invention, component (A) comprises from about 60 to about 75 parts by weight of a vinyl terminated polydiorganosiloxane having a viscosity of 3000 to about 5000 centipoise at 25° C., and from about 25 to about 40 parts by weight of the vinyl-containing MQ resin.

In a further preferred embodiment of the composition of the present invention, component (A) comprises 100 parts by weight of:

(1) a blend containing from about 25 to about 35 parts by weight of a vinyl-containing polydiorganosiloxane having a viscosity of 3000 to about 5000 centipoise of 25° C. and from about 65 to about 75 parts by weight of a vinyl-containing polydiorganosiloxane having a viscosity of 75,000 to about 95,000 centipoise at 25° C., the total amount being 100 parts by weight. Preferably, component (A) will additionally contain (2) from about 5.5 to about 7.5 parts by weight of a low viscosity polydiorganosiloxane composition having an average of at least one vinyldiorganosiloxy end group, a vinyl content of from about 0.2 to about 0.3% by weight and a viscosity of from about 400 to about 700 centipoise at 25° C., and (3) from about 5.5 to about 7.5 parts by weight of a low viscosity vinyldiorgano end-stopped vinylorganodiorganopolysiloxane having a vinyl content of from about 1.4 to about 2.0% by weight and a viscosity of from about 300 to about 600 centipoise at 25° C., and 0 parts by weight of the vinyl containing MQ resin. Preferably, reinforcing filler is present in the composition containing (A)–(E), if (A) contains this vinyl polymer blend.

The hydrogen containing polysiloxane of formula (1) functions as a crosslinking agent. A preferred hydrogen containing polysiloxane has the formula,

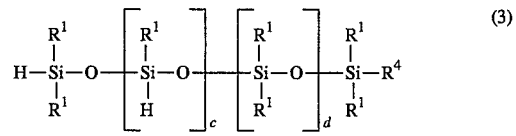

where $R^1$ is as defined above, $R^4$ is $R^1$ or hydrogen, "c" and "d" have values which are sufficient when added together to provide a viscosity of from about 10 to about 1000, and as a hydrogen containing polysiloxane fluid, has a hydrogen content of from about 0.02 to about 1.6% by weight.

The hydrogen containing polysiloxane fluid of formula (3), can be used as a hydride cross-linking agent in the present invention. In formulas (1) and (3) above, $R^1$ is preferably selected from alkyl radicals of 1 to 8 carbon atoms, phenyl, fluoroalkyl radicals of 3 to 10 carbon atoms and hydrogen, the preferred fluoroalkyl radical being trifluoropropyl. Most preferably, $R^1$ represents a methyl radical.

The hydrogen containing polysiloxane fluid of formula (3) can have a viscosity of from about 10 to about 1000 and preferably from about 10 to about 150 centipoise at 25° C.

Other hydrogen containing polysiloxane fluids which can be used in the present invention include fluid siloxane copolymer resins comprised of $(R^1)_3SiO_{1/2}$ units ("M"), $SiO_{4/2}$ units ("Q"), and units such as $H(R_1)_2SiO_{1/2}$ units ("$M^H$"), $HR^1SiO_1$ units ("$D^H$") and $(R^1)_2SiO_1$ units ("D") and the like, and the mixtures of fluid polyorganosiloxanes and fluid siloxane copolymer resins described in U.S. Pat. No. 3,627,851, which is hereby incorporated by reference herein. The preferred resins are known as $M^HQ$ resins, which comprise diorganohydrogensiloxy units ($M^H$ units) and $SiO_{4/2}$ units (Q units), wherein the ratio of diorganohydrogensiloxy units ($M^H$) units to Q units is from 0.4:1.0 to 2.0:1.00 inclusive. Hydrogen containing polysiloxanes having at least one $R^1$ group, preferably, a methyl group, bonded to silicon which bears at least one reactive hydrogen atom are preferred. It is to be understood that the hydrogen containing polysiloxane can be a single compound or a mixture of compounds. Additional hydrogen containing polysiloxanes suitable for use in the present invention are disclosed, for example, in U.S. Pat No. 4,061,609 to Bobear, which is hereby incorporated by reference herein.

Further examples of hydrogen-containing polysiloxanes which can be used in the present invention are linear triorgano-endstopped organohydrogen-polysiloxane fluids having a viscosity of from about 15 to about 40 centistokes at 25° C., and a hydrogen content of 1.6% by weight. These hydrogen containing polysiloxanes generally have the formula,

$(R^1)_3SiO(HR^1SiO)_eSi(R^1)_3,$     (4)

wherein $R^1$ is as previously defined herein and "e" is a number sufficient to provide a viscosity of from about 15 to about 40 centistokes at 25° C.

It is preferred that the hydrogen-containing polysiloxane of formulas (3) and (4) have a hydride content of 0.05 to 1.6%, and more preferably of 0.1 to 1% by weight. In instances where the essentially cyclic-free vinyl containing polydiorganopolysiloxane has a viscosity of between 3000 to 5000 centipoise and the hydrogen containing polysiloxane is a triorgano-stopped organohydrogensiloxane, the SiH:SiVinyl ratio is preferably at least 2.1:1, while about 2.1:1 to about 10.1, or from about 2.1:1 to about 3.5:1 is particularly preferred.

Component (C) of the adhesion composition of the present invention which promotes the hydrosilylation reaction is a platinum group metal catalyst. Additional catalysts for facilitating the hydrosilylation curing reaction include precious metal catalysts such as those which use ruthenium, rhodium, palladium, osmium, and iridium, and complexes of these metals. Examples of suitable hydrosilylation catalysts for use in the present invention are disclosed, for example, in U.S. Pat. Nos. 3,159,601 and 3,159,662 (Ashby); 3,220, 970 (Lamoreaux); 3,814,730 (Karstedt); 3,516,946 (Modic), and 4,029,629 (Jeram); all of the foregoing patents being hereby incorporated by reference herein.

Preferable, the hydrosilylation catalyst is a platinum containing catalyst. A preferred platinum-containing catalyst is a platinum-octanol complex containing 90.9 weight % octyl alcohol and 9.1 weight % chloroplatinic acid.

Another preferred platinum-containing catalyst is a platinum complex formed by reacting chloroplatinic acid containing 4 moles of water of hydration with tetravinylcyclotetrasiloxane in the presence of sodium bicarbonate in an ethanol solution. This catalyst is disclosed in U.S. Pat. No. 3,775,452 to Karstedt, which is hereby incorporated by reference herein.

The catalyst must be used in a catalytic amount, which is that amount sufficient to promote the hydrosilylation reaction. Generally, there must be utilized at least 0.1 part per million of a platinum catalyst, and preferably from 5ppm to 250ppm, in terms of parts of platinum metal based on the weight of hydrosilylation mixture. Inhibitors, such as acetylenic alcohols, amines, cyanurates also can be employed when used in an effective amount.

The composition of the present invention may also contain any of the conventional (E) extending and/or (F) reinforcing fillers. The composition contains from about 0 to about 200 and preferably from about 10 to about 100 parts by weight of (E) an extending filler, and from about 0 to about 50, and preferably from about 20 to about 50 parts by weight of (F) a reinforcing filler.

Examples of extending fillers (E) useful herein include alpha quartz, crushed quartz, aluminum oxide, aluminum silicate, zirconium silicate, magnesium oxide, zinc oxide, talc, diatomaceous earth, iron oxide, calcium carbonate, clay, titania, zirconia, mica, glass, such as ground glass or glass fiber, sand, carbon black, graphite, barium sulfate, zinc sulfate, wood flour, cork, fluorocarbon polymer powder and the like. The preferred extending filler for use in the present invention is alpha quartz.

Examples of reinforcing fillers (F) include silica, such as fumed silica and precipitated silica, and treated silica fillers such as fumed or precipitated silica that has been reacted with, e.g., an organohalosilane, a disiloxane, or a disilazane. Fumed silica is particularly effective as a reinforcing filler for the silicone component of the present invention. A particularly preferred treated fumed silica is one wherein a fumed silica has been treated first with cyclic polysiloxanes, e.g., dimethylcyclic tetramer, according to the methods known in the art, for example, as taught in U.S. Pat. No. 2,938,009 (Lucas), which is incorporated by reference herein, and then treated with a silazane, e.g., hexamethyldisilazane, for example, as taught in U.S. Pat. Nos. 3,635,743 (Smith) and 3,847,848 (Beers), which are both incorporated by reference herein, so as to remove most of the free silanols on the surface of the tetramer treated silica. Such a filler is sometimes referred to herein as "treated fumed silica".

The composition of the present invention can be prepared by homogeneously mixing components (A)–(F) and any optional ingredients, using suitable mixing means, such as a spatula, a drum roller, a mechanical stirrer, a three-roll mill, a sigma blade mixer, a bread dough mixer and a two-roll mill.

The order of mixing components (A)–(F) is not critical, however, it is preferred that components (B) and (C) be brought together in the presence of component (D), most preferable in a final mixing step. Thus, it is possible to mix all components in one mixing step immediately prior to the intended use of the curable composition. Alternatively, certain components can be premixed to form two or more packages which can be stored, if desired, and then mixed in a final step immediately prior to the intended use thereof.

It is preferred to mix components (C), (D), and a portion of component (A), along with certain optional components, such as fillers and solvents, to provide a first package. Separately, component (B), along with the remaining portion of component (A), if any, can be mixed to provide a second package. These two packages can then be stored until the composition of this invention is desired and then homogeneously mixed.

The thickness of the adhesive composition on a substrate is typically from about 20 to about 60 mils. The adhesive composition of the present invention can be applied to the surface of the substrate by any suitable means such as rolling, spreading, spraying, and the like, and cured as described above. After application of the adhesive composition onto the substrate, the composition can be cured at a temperature in the range of 25° C. to 150° C. over a period of 0.25 hrs to 120 hours.

In order that those skilled in the art may better understand the practice of the present invention, the following examples are given by way of illustration and not by way of limitation. All parts are by weight.

EXAMPLE 1

There was added 10 g of sodium metal to 100 ml of allyl alcohol under nitrogen which had been cooled with ice. After the sodium had dissolved, there was added dropwise, 15g of 2,6 dichloropyridine. The mixture was refluxed for about twelve hours. The mixture was allowed to cool and 200 ml of water was added. The water layer was extracted thrice with 50 ml of diethyl ether. The ether layer was washed with a saturated sodium chloride solution and dried over magnesium sulfate.

After filtration, the solvent was removed. The product was distilled under 0.1 tort, at 60°–65° C. Reaction was effected between 2 g of 2,6 diallylether pyridine, 4 g of trimethoxysilane and 4 μL of a hydrocarbon solvent solution of a platinum-vinylsiloxane complex shown in Karstedt U.S. Pat. No. 3,775,452. The mixture was then heated for 2 hours at 70° C. Based on $^1$H NMR, the product was 2,6 bis(trimethoxysilyltrimethyleneoxy)pyridine, referred to below as the adhesion promoter.

A room temperature vulcanizable formulation was prepared by adding 5 parts of a methylhydrogensiloxydimethylsiloxy copolymer having a hydrogen content of about 0.8% by weight to a mixture of 50 parts of a polydimethylsiloxane having terminal dimethylvinylsiloxy units and a viscosity of about 80,000 centipoise, 16.7 parts of a resin consisting essentially of condensed $(CH_3)_3SiO_{1/2}$ units, $(CH_3)_2ViSiO_{1/2}$ units and $SiO_2$ units, and about 2.4% by weight vinyl, 33.3 parts of crystalline quartz, 12.5 ppm of platinum as catalyst shown in Karstedt U.S. Pat. No. 3,775,452, 5 μL of 3.5 dimethyl-1-hexyn-3-ol and 1 part of the above adhesion promoter.

Several lap shear test samples were prepared from 1"×½" alclad aluminum coupons after treatment with the above curable formulation The samples were allowed to cure for 7 days at ambient temperatures The cohesive strength of the lap shear samples were measured on an Instron 4202 at a speed of 0.5 in/per minute An average value of 574 lb/in were obtained, along with 100% of cohesive failure.

EXAMPLE 2

A curable formulation was prepared in accordance with example 1, by adding 0.23 g of the methylhydrogensiloxane copolymer to a mixture of 13 g of the vinyl terminated polydimethylsiloxane containing 20% of fumed silica, 1 μL of 3,5 dimethyl-1-hexyn-3-ol, 10 ppm of platinum and 0.05 g of the adhesion promoter of example 1.

Several 1"×½" lap shear test samples of alclad aluminum were prepared and cured for 24 hours at room temperature There was obtained a composite which failed cohesively after a 250 lb/in$^2$ shear test.

EXAMPLE 3

A curable mixture was prepared in accordance with the procedure of example 2, by adding 0.23 g of the methylhydrogensiloxane copolymer to a mixture of 13 g of the vinyl terminated polydimethylsiloxane, 9.2 L of a solution of 0.03 g $Pt[(ethyl)_2S](Cl)_2$ in 0.5 g 2,6 bis(trimethoxysilyltrimethyleneoxy)pyridine, and 0.05 g of the adhesion promoter.

Several 1"×½" test samples of aluminum, and Ultem® polyetherimide of GE Co. Plastics Division, were cleaned using an Oakite detergent wash at 60° C. followed by a distilled water rinse for the aluminum, and a KOH bath at 70° C., followed by a distilled water rinse and air dry for the plastic.

Lap shear composites were prepared and tested as in example 2. It was found that after a 24 hour cure at room temperature, the aluminum samples failed cohesively at an average of 250 lb/in$^2$ lap shear showed an average cohesive failure at 250 lb/in$^2$ lap shear and the plastic samples showed an average of 300 lb/in$^2$ lap shear. Adhesive failures occurred using the same formulations without the adhesion promoter and cured under the same conditions.

Although the above examples are directed to only a few of the very many variables which can be used in the practice of the present invention, it should be understood that the present invention is directed to a much broader variety of adhesion promoters and room temperature addition-curable organopolysiloxane compositions as shown in the description preceding these examples.

What is claimed is:

1. A room temperature vulcanizable addition-curable composition, comprising by weight, (A) 100 parts of a vinyl-containing polydiorganosiloxane composition comprising:

(i) about 50 to about 100 parts of an essentially cyclic-free vinyl containing polydiorganosiloxane having a viscosity of from about 100 to about 100,000 centipoise at 25° C. and organo groups attached to silicon by carbon-silicon bonds, selected from the class consisting of alkyl radicals having 1 to 8 carbon atoms, phenyl radicals, fluoroalkyl radicals having 3 to 10 carbon atoms and mixtures thereof, where the essentially cyclic-free vinyl containing polydiorganosiloxane has a vinyl content of from about 0.02 to about 2.0 weight %, and (ii) from about 0 to about 50 parts of a solid, benzene-soluble vinyl-containing resin copolymer comprising,

 $(R)_3SiO_{1/2}$ units and $SiO_{4/2}$ units, where R is a vinyl radical, or a monovalent hydrocarbon radical free of aliphatic unsaturation and containing no more than six carbon atoms, the ratio of $(R)_3SiO_{1/2}$ units to $SiO_{4/2}$ units being from about 0.5:1 to about 1.5:1, and the resin having a vinyl content of from about 1.5 to about 3.5% by weight, (B) from about 1 to about 20 parts of a hydrogen-containing polysiloxane having an average unit formula,

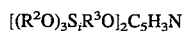 $R^1{}_aH_bSiO_{(4-a-b)/2}$, where $R^1$ is a monovalent hydrocarbon radical, or halogenated monovalent hydrocarbon radical having from 1 to about 10 carbon atoms and free of aliphatic unsaturation, "a" has a value of from about 0 to about 3, "b" has a value of from about 0 to about 3, and the sum of "a"+"b" has a value of from 0 to 3, (C) a catalytic amount of a hydrosilylation catalyst, (D) an effective amount of a bis[trialkyloxysilylalkyleneoxy]pyridine adhesion promoter having the formula, $[(R^2O)_3S_iR^3O]_2C_5H_3N$ where $R^2$ is a $C_{(1-4)}$ alkyl radical and $R^3$ is a $C_{(2-8)}$ alkylene radical, (E) from about 0 to about 200 parts of an extending filler, and (F) from about 0 to about 50 parts of a reinforcing filler, and in the absence of (A) (ii), an amount effective for reinforcement.

2. A room temperature vulcanizable composition in accordance with claim 1, where the vinyl-containing polydiorganopolysiloxane is a vinyl-containing polydimethylsiloxane.

3. A room temperature vulcanizable composition in accordance with claim 1, where the solid, benzene-soluble vinyl-containing resin comprises a mixture of $(CH_3)_3SiO_{1/2}$ units and $Vi(CH_3)_2SiO_{1/2}$ units and $SiO_2$ units.

4. A room temperature vulcanizable composition in accordance with claim 1, where the hydrosilylation catalyst is a platinum catalyst.

5. A room temperature vulcanizable composition in accordance with claim 1, where the adhesion promoter is 2,6-bis(trimethoxysilyltrimethyleneoxy)pyridine.

6. A room temperature vulcanizable composition in accordance with claim 1 having a reinforcing filler.

7. A room temperature vulcanizable composition in accordance with claim 1 having an extending filler.

8. A room temperature vulcanizable composition in accordance with claim 1 having a mixture of a reinforcing and an extending filler.

9. A room temperature vulcanizable composition in accordance with claim 1 employing an effective amount of an inhibitor in combination with the hydrosilylation catalyst.

* * * * *